United States Patent [19]

Marginean

[11] 4,287,264

[45] Sep. 1, 1981

[54] HEAT SENSITIVE COATING

[75] Inventor: Barry L. Marginean, Scottsville, N.Y.

[73] Assignee: Labelon Corporation, Canandaigua, N.Y.

[21] Appl. No.: 128,195

[22] Filed: Mar. 7, 1980

[51] Int. Cl.$^3$ .................... B41M 5/18; B41M 5/22; C09D 11/10

[52] U.S. Cl. .................................. 428/514; 106/21; 260/42.51; 282/27.5; 427/151; 427/153; 428/537; 428/913; 428/914

[58] Field of Search .................... 106/21; 260/42.51; 282/27.5; 427/150, 151, 153; 428/207, 211, 307, 514, 537, 913, 914; 430/348, 964

[56] References Cited

U.S. PATENT DOCUMENTS

| | | | |
|---|---|---|---|
| 3,539,375 | 11/1970 | Baum | 428/913 |
| 3,674,535 | 7/1972 | Blose et al. | 428/913 |
| 3,859,112 | 1/1975 | Kohmura et al. | 428/913 |
| 3,920,510 | 11/1975 | Hatano et al. | 282/27.5 |
| 3,950,600 | 4/1976 | Knirsch | 428/913 |

*Primary Examiner*—Bruce H. Hess

*Attorney, Agent, or Firm*—Cumpston & Shaw

[57] ABSTRACT

A color forming heat sensitive coating composition comprising a color forming amount of a finely divided homogenous basic 3,3-bisarylphthalane derivative and a color developing amount of a finely divided solid phenyl derivative which at thermal printing temperature is at least partly fluidizable and capable of a color forming reaction with said 3,3-bisarylphthalane compound dispersed in a polyvinyl alcohol carrier is disclosed wherein the improvement comprises the addition of an anti-sticking amount of a functional filler which may be a di(lower alkyl)dithiocarbamate or lower alkylxanthate of lead, zinc, cadmium and alkaline earth metals or a tetra (lower alkyl)thiuram disulfide or a di(lower alkyl) xanthogen.

9 Claims, No Drawings

HEAT SENSITIVE COATING

BACKGROUND OF THE INVENTION

The present invention relates to an improvement in a heat sensitive paper for thermal printing devices and a heat sensitive coating composition for such papers comprising a chromogenous basic triphenylmethane derivative, in particular a basic diarylphthalide derivative, and an acidic phenolic color-developer in a carrier composition as described in U.S. Pat. No. 3,539,375 to H. H. Baum.

As described in the aforementioned U.S. patent, the entire disclosure of which is herein incorporated by reference, the chromogenic compound and the phenolic colordeveloper both are distributed in finely divided solid form in a carrier or binder, preferably a polyvinylalcohol. Upon local application of heat, one of the color-forming reactants usually the phenolic compound, is fluidized thus leading to an intimate contact between the two color-forming reactants and the taking place of the color-forming reaction localized at the site of heating at thermal printing temperatures. Heat-sensitive record materials containing a chromogeneous and a color developing compound distributed in a polyvinyl alcohol coating composition are also disclosed in U.S. Pat. Nos. 3,920,510, and 3,674,535.

The use of a polyvinyl alcohol film as a matrix for heat sensitive compositions is said to provide unexpected properties which make it uniquely attractive as a temperature responsive record material. It is widely used in conventional heat sensitive imaging systems and compositions. However, such conventional heat-sensitive coating compositions and papers for thermal printing coated therewith still suffer from various disadvantages, such as a tendency for premature self-color development, lack of environmental stability, i.e. to heat, moisture and light, as well as an undesirable degree of pressure sensitivity of the coated paper. Moreover, such compositions, as those described in U.S. Pat. No. 3,539,375, suffer the disadvantage of sticking as the paper moves past the printing head. This necessitates the addition of talc to alleviate this problem, see column 7, lines 64 and 65 of this patent.

SUMMARY OF THE INVENTION

It is an object of the present invention to provide a heat-sensitive record material for thermal printing devices, in particular a heat-sensitive paper sheet, and a heat sensitive coating composition therefore with improved printing and storage characteristics.

Especially, it is an object of the present invention to provide a coated heat-sensitive paper wherein any stick tendencies of the paper during the heat-printing process due to melting or softening of the coating under the heat and adherence of the re-solidified coating to e.g. the printing head is substantially reduced and free movement of the paper during the printing process is ensured.

It is a further object of the present invention to provide such a heat-sensitive paper which leads to a substantial reduction of the noise level during the printing process.

It is a further object of the present invention to provide a heat-sensitive paper with increased color intensity at usual thermal printing temperatures using substantially less dry coating composition.

In order to accomplish the foregoing objects, according to the present invention, there is provided a heat-sensitive coating composition which comprises a color-forming amount of a finely divided solid chromogenous basic 3,3-bisarylphthalane derivative, and a color developing amount of a finely divided solid phenol derivative which at thermal printing temperature is at least partially fluidizable and capable of a color-forming reaction with the chromogenous 3,3-bisarylphthalane derivative distributed in a carrier composition comprising a polyvinyl alcohol matrix, the system described in U.S. Pat. No. 3,539,375 and a stick reducing amount of a functional filler selected from the group consisting of di(lower alkyl)dithiocarbamates and lower alkylxanthates of lead, zinc, cadmium and alkaline earth metals and tetra(lower alkyl) thuiram disulfides and di(-loweralkyl)xanthogens.

DETAILED DESCRIPTION OF THE INVENTION

It has been found that heat-sensitive coating compositions and coated papers for thermal printing of superior quality are obtained when the chromogenous bisarylphthalane derivatives and color developing phenols used therein are incorporated in a polyvinyl alcohol binder-carrier composition containing an antisticking amount of a di(loweralkyl)dithiocarbamates and lower alkylxanthates of lead, zinc, cadmium and alkaline earth metals and tetra(loweralkyl) thiuram disulfides and di(-loweralkyl)xanthogens.

The chromogenous bases which can be used in the present invention are arylphthalane derivatives including compounds having the following structure 3,3-bisphenylphthalane element

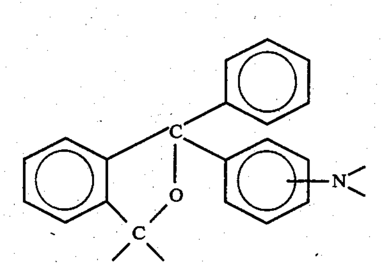

wherein the benzene nuclei may be further substituted. These chromogenous compounds are well known in the art and include chromogenous compounds disclosed in U.S. Pat. No. 3,560,229, the disclosure of which is hereby incorporated by reference.

Examples of particularly suitable chromogenous compounds include compounds having the formula

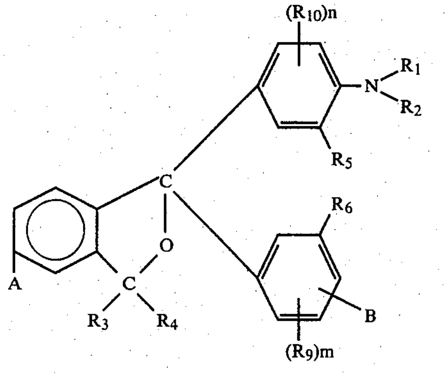

wherein $R_1$ and $R_2$ may be the same or different and represent hydrogen or lower alkyl;

$R_3$ and $R_4$ each represent hydrogen, or $R_3$ and $R_4$ together represent oxo;

$R_5$ and $R_6$ each represent hydrogen or together represent oxo;

A represents hydrogen or a

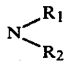

group wherein $R_1$ and $R_2$ are as defined above, and B represents hydrogen or a substituent which if $R_5$ and $R_6$ represent hydrogen preferably is in p-position and represents a

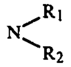

group wherein $R_1$ and $R_2$ are as defined above or a O-$R_7$ group wherein $R_7$ is lower alkyl; or which if $R_5$ and $R_6$ together represent oxo preferably is in m-position and represents a

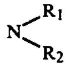

group wherein $R_1$ is as defined above and $R_8$ represents hydrogen, lower alkyl, phenyl, phenyl substituted by halogen, preferably chlorine, or lower alkyl, preferably methyl;

$R_9$ and $R_{10}$ may be the same or different and represent methyl or halogen, in particular chlorine or bromine; and n and m may be the same or different and represent a number between zero and 3.

Chromogenous compounds within the above group are 3,3-bis(p-di(loweralkyl)aminophenyl) phthalides optionally carrying a further di(lower alkyl)amino group in the phthalide nucleus, and 3-di(lower alkyl-)amino-7-anilofluorans, such as 3-diethylamino-7-(p-chloroanilinofluoran.

Another group of particularly suitable chromogenous basic 3,3-bisarylphthalane derivatives includes compounds wherein the aryl groups are heterocyclic basic aryl groups, e.g. indol groups, in particular compounds of the formula

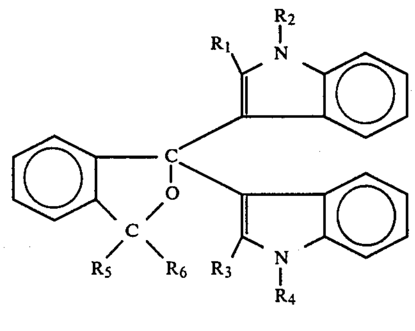

wherein $R_1$ and $R_3$ which may be the same or different represent hydrogen or lower alkyl, preferably containing 1 to 4 carbon atoms, in particular methyl;

$R_2$ and $R_4$ which may be the same or different represent hydrogen or lower alkyl, preferably containing 1 to 4 carbon atoms, in particular ethyl or methyl; and $R_5$ and $R_6$ each represent hydrogen or $R_5$ and $R_6$ together represent oxygen.

A wide variety of phenol derivatives which are useful as color developing reagents in heat-sensitive coating compositions are well known in the art. In order to obtain a stable composition, the phenol has to be solid and exhibit only a minor vapor pressure at room temperature. Yet it should at least partially liquify and/or vaporize at normal thermal printing temperatures in order that intimate contact of the phenol with the chromogenous compound is achieved and the color-forming reaction takes place at the site of heating. Suitable phenolic compounds include alkyl and/or aryl substituted monophenols, diphenols and triphenols. Examples of suitable phenols are disclosed in U.S. Pat. Nos. 3,539,375, 3,244,548 and 3,244,550, the disclosures of which are hereby incorporated by references.

Preferred phenol derivatives include bis-phenols of the formula

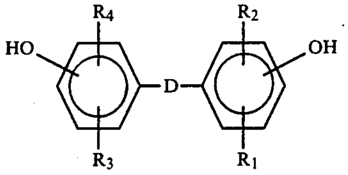

wherein D represents a bond or a lower alkylidene group, preferably containing 1 to 4 carbon atoms, in particular methylene, isopropylidene, or 2,2-butylidene, or 1,1-cyclohexylidene; the OH groups are in ortho- or preferably in para-position to D;

$R_2$ and $R_4$ which may be different but preferably are the same, represent hydrogen, halogen, in particular chlorine or bromine, lower alkyl, preferably containing 1–4 carbon atoms, in particular methyl or tert, butyl, or hydroxy; and $R_1$ and $R_3$ which may be different but preferably are the same, represent methyl or halogen, in particular chlorine or bromine.

4,4'-Isopropylidene bis-phenol is particularly preferred.

Other suitable phenol compounds include naphthols, lower alkyl substituted phenols, e.g. tert butylphenols, phenol substituted phenols and phenoxy substituted phenols.

As is well known to anyone skilled in the art, the type of chromogenic compounds or mixtures thereof and of the phenol used will of course vary depending on the desired color of the colored marks which are produced on the heat-sensitive paper during thermal printing. Equally, the amount of chromogenic compound and color-developing phenol will vary largely depending on the type of compounds which are used and on the desired shade and intensity of color in the produced colored marks.

For example, for obtaining blue-colored marks, a combination of 3,3-bis(4-dimethylaminophenyl)6-dimethyl phthalide, known as "crystal violet lactone" and of 4,4'-isopropylidenediphenol, known as bisphenol A is preferred. Satisfactory results are obtained with coating compositions containing from about 2 to about 30, preferably from about 10 to about 15% by weight of 3,3'-bis(p-dimethylaminophenyl) phthalide and from about 16 to about 36, preferably from about 30 to about 35% by weight of bisphenol A, relative to the amount of solids in the coating composition.

Both the chromogenous compound and the phenol have to be distributed throughout the coating in finely divided form, preferably in the form of particles having a particle size of from about 1 to about 3 microns.

The antistick functional filler material which includes compounds of the general formula

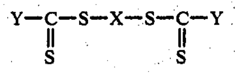

wherein X represents a bond or a metal selected from the group consisting of lead, zinc, cadmium and alkaline earth metals and Y represents lower alkyloxy or lower dialkylamino. Suitably such compounds include di(-lower alkyl)dithiocarbamates of the formula

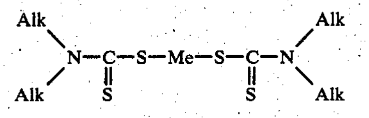

wherein Alk represents lower alkyl, preferably containing 1 to 4 carbon atoms, such as, e.g. methyl, ethyl, isopropyl or n-butyl; and Me represents one of the above cited metals, preferably zinc; lower alkylxanthates of the formula

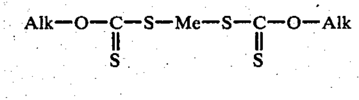

wherein Alk is as defined above and preferably represents isopropyl or ethyl, and Me is as defined above and preferably represents zinc;

tetra(lower alkyl)thiuram disulfides of the formula

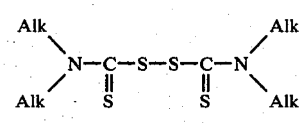

wherein Alk is as defined above and preferably represents methyl; and di(lower alkyl) xanthogens of the formula

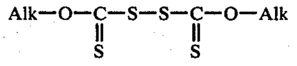

wherein Alk is as defined above.

Zinc di-n-butyldithiocarbamate (i.e., zinc zionate) is a preferred such filler material which provides an additional image enhancing effect.

The functional filler material suitably is used in amounts of from about 2 to about 60, preferably from about 30 to about 50 and most preferably about 40% by weight relative to the total solid content of the coating composition. It is clear that the exact amount of functional filler will vary over a wide range depending upon the other ingredients in the coating composition. The aforementioned ranges provide a basis on which the exact amount can be experimentally obtained as will be appreciated by one of ordinary skill in the art.

A preferred heat-sensitive coating composition according to the present invention comprises in % by weight relative to the total solid content: about 3% of the chromogenic compound, preferably crystal violet lactone;

about 27% of the phenol derivative, preferably 4,4'-isopropylidene diphenol;

about 30% of the polyvinyl alcohol and about 40% of zinc di-n-butyldithiocarbamate.

If desired, the heat-sensitive coating composition according to the present invention may additionally include conventional additives for heat-sensitive coating compositions and papers, e.g., binders, carriers and lubricants, such as polyvinylalcohol, methacell, glycowax, magnesium stearate and the like.

The coating composition according to the present invention may consist of two separate mixtures; namely, a chromogenic mixture containing the chromogeneous compound, a portion of the total amount of the polyvinyl alcohol binder, and the other ingredients of the coating; and the color-developing mixture containing the phenol and the remaining portion of the polyvinyl alcohol. Both mixtures may be stored separately and be mixed together before application to the paper, or may be applied separately to the paper to form successive layers of coating thereon.

The heat-sensitive record sheet materials according to the present invention comprise a support sheet which is coated on one or both of its surfaces and/or impregnated with the heat-sensitive composition.

The preferred support is a thin relatively opaque, white paper sheet.

However, the heat-sensitive composition according to the present invention may also be applied to sheet or bands of film-like polymeric material, woven material or laminated material to form a heat sensitive record material.

The paper sheet may be coated and/or impregnated with one or more layers of a single heat-sensitive composition containing both the chromogenous compound and the phenol distributed therein; or the phenol and the chromogenous compounds may each be contained in a different layer of a multilayer coating, e.g. the paper may carry a first base coat of a coating mixture containing the phenol covered by a second coat of a coating mixture containing the chromogeous compound.

Alternatively, a first support sheet coated with the coating mixture containing the phenol may be placed into face-to-face relationship with a second support sheet coated with the coating mixture containing the chromogenic compound.

The total amount of coating composition per support material may vary depending on the specific type of paper and the specific composition which are used, as well as the desired printing and processing behavior of the final product.

Satisfactory results are generally obtained with an amount of from about 1.5 to about 3, preferably from about 1.6 to about 2.75 grams of total coating composition per $m^2$ of support paper.

The heat-sensitive record sheets according to the present invention are prepared by conventional paper-coating methods, e.g. by coating the support paper with an aqueous dispersion of the coating composition by means of rollers, spray brushes or in any other known manner and allowing the coating to dry.

For preparing the aqueous dispersion of the coating composition a first mixture containing the phenol and a portion of the polyvinyl alcohol carrier, and a second mixture containing the chromogenous compound, the remainder of the polyvinyl alcohol, the functional filler and any other ingredients each are separately ground with water, suitably at a concentration of between about 10 and about 50%, sufficiently to reduce the solids to an average particle size of several microns, preferably of between about 1 and about3 microns.

The resulting two dispersions may be mixed together in a single coating composition which may be applied to the paper, optionally after being further diluted with water. Alternatively, the two dispersions may be applied to the paper separately to form different layers of coating.

EXAMPLE I

This example describes the preparation of a mark-forming composition and its coating on a paper support sheet for use as a thermal print sheet; that is, direct hot type on the paper coating.

Preparation of crystal violet lactone dispersion-Component A

An attritor was charged with 35 parts by weight of crystal violet lactone, 150 parts by weight of a 10% by weight, aqueous solution of polyvinyl alcohol, and 65 parts by weight water, and ground for one hour. The polyvinyl alcohol used was approximately 98% hydrolyzed, and a 4%, by weight, aqueous solution which had a viscosity of 23 to 28 centipoises as determined at 20 degrees centigrade by the Hoeppler falling ball method was used. (ASTM-D-1343-56). The particle size of the crystal violet lactone was approximately one to three microns after attrition.

Preparation of phenol dispersion-Component B

An attritor was charged with 35 parts by weight of 4,4'-isopropylidine diphenol (Bisphenol A), 150 parts by weight of the polyvinyl alcohol solution described used to form Component A, and 65 parts by weight of water, and the system was ground for one hour. The particle size of the phenol after attrition was approximately one to three microns.

Preparation of butyl zimate dispersion-Component C

An attritor was charged with 35 parts by weight of butyl zimate having an average particle size before milling of approximately 10 microns, 150 parts by weight of a polyvinyl alcohol solution (as described in Component A of Example 1), and 65 parts by weight of water.

Coating Composition

Three parts by weight of Component A, 27 parts by weight of Component B and 40 parts by weight of Component C were combined and coated on paper at the weight of 1.5 to 2.5 pounds per ream (500 sheets 25 inches by 38 inches). The composition of the dried paper coating was:

| | Percent by weight |
|---|---|
| Crystal violet lactone | 3 |
| Bisphenol A | 27 |
| Polyvinyl alcohol | 30 |
| Butyl zimate | 40 |

The function of the butyl zimate is to prevent sticking of the coating to the printing head.

If desired, compatible defoaming or wetting agents may be added to the aqueous dispersion. When talc is employing in the coating composition, it is desirable to have a coating weight of at least four pounds per ream; also, where the system is a "transfer" type, the heavier coating weight is used to advantage.

The use of the sheet of Example I

The sheet of Example I may be used alone as a copy-receiving sheet by being served with a pattern of heat front or back, as by a thermographically-heated original document, by trace of a hot stylus, by hot type, or by any other means giving a differential heat pattern by conduction or convection.

If the heavier coating is used, the sheet may be used reversely for a transfer sheet to produce multiple copies on unsensitized surfaces of any sort, such as bond paper, newsprint, cloth, film, and the like, as long as the pattern of heat is present to control the transfer.

EXAMPLE II

The sheet of Example I, having a coating of four to six pounds per ream, was prepared as specified, and the data to be recorded was printed on the uncoated side. The coated side was placed against plain paper to form a record "pair", which was then subjected to a light source of infra-red wave length, so that the radiation directly struck the printing. A copy of the recorded data appeared on the plain paper. This could be repeated until the coating was exhausted. Moreover, the coated sheet could be used as an intermediate master sheet wherein the heavier coated sheet is written or with thermographic ink directly on the coated side. A piece of plain paper is placed in contact with the coated side of the sheet to form a pair, and the pair if subjected to infra-red radiation. This puts a colored mirror-image of the recorded data on the plain paper. This plain sheet then may be used over and over again against successive sheets of plain paper, and each pair is subjected to a hot press to transfer the colored image in direct reading form.

EXAMPLE III

To form a transfer-type thermally-responsive record material, a sheet was coated with, for example, Component A of Example I to a weight of ½ pound to 1½ pounds per ream, and a second sheet was coated with Component B of Example I to a weight of 4 to 5 pounds per ream; the sheets being placed in face-to-face relation, hereafter called Sheet I and Sheet II, respectively.

I claim:

1. In a color forming heat sensitive coating composition comprising a color forming amount of a finely divided homogenous basic 3,3'-bisarylphthalane derivative and a color developing amount of a finely divided solid phenyl derivative which at thermal printing temperature is at least partly fluidizable and capable of a color forming reaction with said 3,3-bisarylphthalane compound dispersed in a polyvinyl alcohol carrier, wherein the improvement comprises the presence of an antisticking amount of a functional filler of the general formula

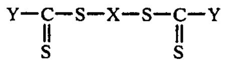

wherein X represents a bond or a metal selected from the group consisting of lead, zinc, cadmium and alkaline earth metal metals and Y represents lower alkyloxy or lower dialkylamino—therefor.

2. The composition of claim 1 wherein the antistick compound is present in an amount of from 2 to about 60% by weight of the dry solid content of the composition.

3. The composition of claim 1 wherein the antistick compound is selected from the group consisting of di(-loweralkyl)dithiocarbamates and lower alkylxanthates of lead, zinc, cadmium and alkaline earth metals and tetra(lower alkyl)thiuram disulfides and di(loweralkyl)xanthogens.

4. The composition of claim 3 wherein the functional filler is a di(loweralkyl)dithiocarbamate.

5. The composition of claim 4 wherein the dithiocarbamate is di-n-butyldithiocarbamate.

6. The composition of claim 5 wherein the 3,3-bisarylphthalane is leuco crystal violet lactone.

7. The composition of claim 6 wherein the relative amount of polyvinyl alcohol to crystal violet lactone and the phenolic material is from 5% to 40% by weight.

8. The composition of claim 7 wherein the amount of di-n-butyldithiocarbamate is about 40 weight percent.

9. A thermo responsive material comprising paper coated with the composition of claim 1.

* * * * *